H. R. ADAMS.
PACKING ATTACHMENT FOR DISK HARROWS.
APPLICATION FILED MAY 27, 1912.

1,049,030.

Patented Dec. 31, 1912.

Witnesses:
R. Hamilton
E. C. Lillian

Inventor,
Herbert R. Adams
By F. G. Fischer, Atty.

COLUMBIA PLANOGRAPH CO., WASHINGTON, D. C.

UNITED STATES PATENT OFFICE.

HERBERT R. ADAMS, OF HALSTEAD, KANSAS.

PACKING ATTACHMENT FOR DISK HARROWS.

1,049,030.  Specification of Letters Patent.  Patented Dec. 31, 1912.

Application filed May 27, 1912. Serial No. 699,975.

*To all whom it may concern:*

Be it known that I, HERBERT R. ADAMS, a citizen of the United States, residing at Halstead, in the county of Harvey and State of Kansas, have invented certain new and useful Improvements in Packing Attachments for Disk Harrows, of which the following is a specification.

This invention relates to land-packer attachments for disk harrows.

The object of the invention is to provide a combined land packer and harrow which will simultaneously pack, and to some extent cultivate the soil; and a further object is to provide a device of this kind that may be kept tight upon the disks to which it is attached, regardless of the decreasing diameter of a disk, caused by working the soil.

Figure 1:
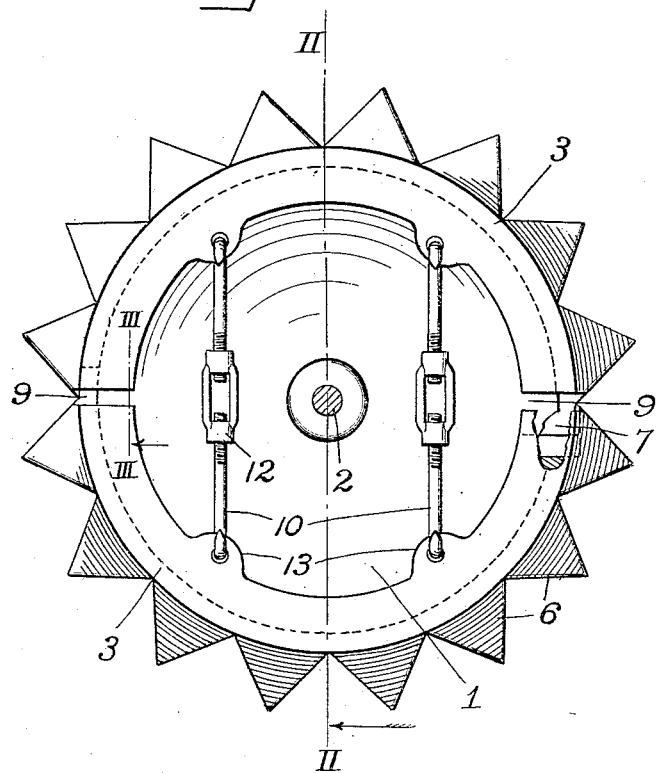
Figure 2:
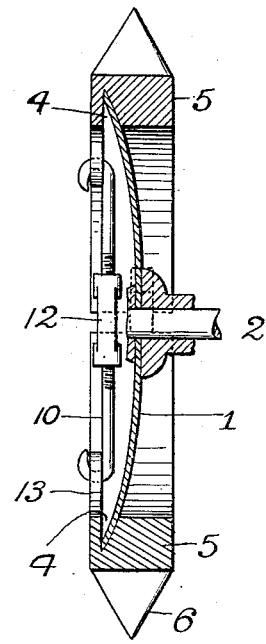
Figure 3:
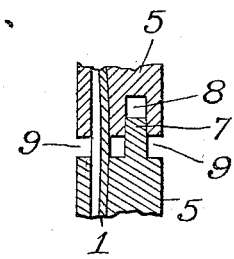

To these ends the invention resides in the novel construction to be described, and in order that said invention may be fully understood, reference will now be made to the accompanying drawing, in which:

Figure 1 is an elevation view of said attachment in position upon a disk. Fig. 2 is a central section of the same, on line II—II of Fig. 1. Fig. 3 is a detail view, sectioned on line III—III of Fig. 1.

1 designates a disk of the present standard shape; 2 the shaft or axle on which it is rotatably-mounted.

The attachment consists of two arcuate rim sections 3, each having therein a groove 4, adapted to receive the periphery of the disk 1. These sections are duplicates of each other, and each comprises a heavy rim 5, provided with a continuous series of pyramidal teeth 6. The ends of each section are formed with co-fitting tongues 7 and grooves 8, and it is important that ample spaces as 9 be left between the proximate ends, in order to provide for the sections being tightly fastened on the disk as the latter becomes smaller in diameter by wear. The sections are fastened together by hook-bolts 10 and turnbuckles 12; the sections are provided with eye-lugs 13 for reception of the hooked ends of the bolts.

The teeth 6 are preferred to a continuous rim because the latter would merely pack the soil, whereas the toothed packing rim operates to cultivate, as well as pack, the soil.

When the farmer is through using the packing attachments he removes them from the disks and may then use the harrow as such. When the packer sections are reattached to the disks (which may then be reduced in size) the space 9 will permit said sections to be drawn against the disk periphery by the turnbuckles.

In practice, suitable packing, such as canvas, leather, etc., may be interposed between the cutting edge of the disk and the attachment to prevent the latter from dulling the former.

Having thus described my invention what I claim and desire to secure by Letters Patent, is:

1. An attachment of the kind described, comprising two arcuate sections each having a groove to receive the periphery of a disk; each section having a heavy rim provided with a series of pyramidal teeth, and adjustable means to fasten said members upon a disk.

2. An attachment of the kind described, comprising two arcuate halves, each half comprising a heavy rim having an internal groove for periphery of a disk, a series of teeth projecting from said rim, each of said halves being provided with tongued and grooved ends and with lugs adapted for attachment of bolts, bolts adapted to engage said lugs, and turnbuckles for tightening said bolts.

In testimony whereof I affix my signature, in the presence of two witnesses.

HERBERT R. ADAMS.

Witnesses:
JEROME A. ALBERT,
WALTER A. BARIGE.

---

Copies of this patent may be obtained for five cents each, by addressing the "Commissioner of Patents, Washington, D. C."